July 7, 1964  M. R. SMITH ETAL  3,139,750
HYDRAULIC FORCE BALANCE APPARATUS
Filed Aug. 24, 1961
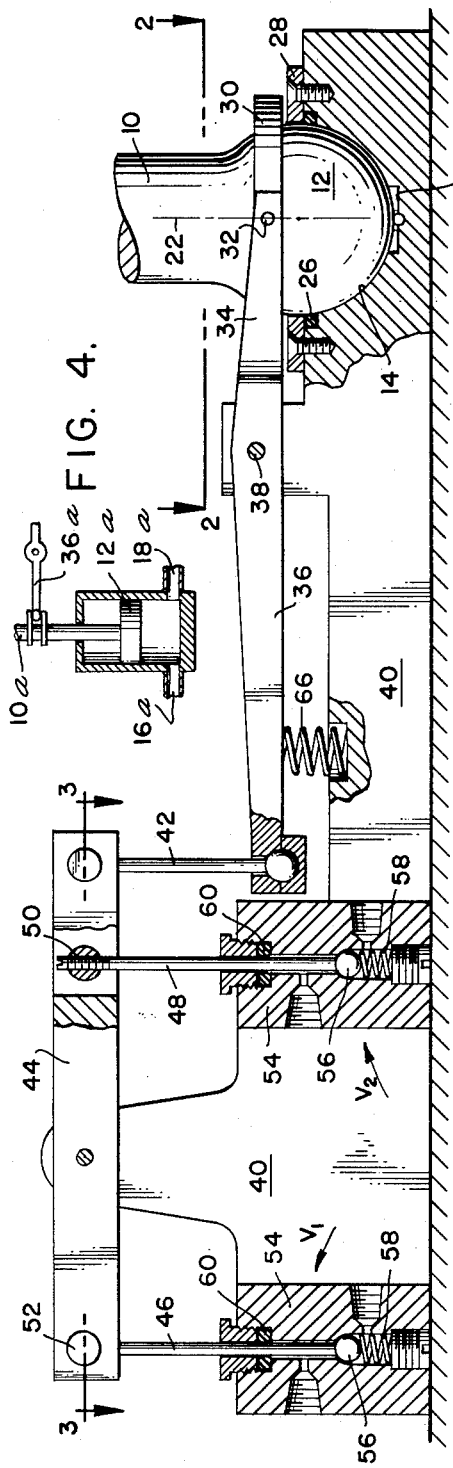
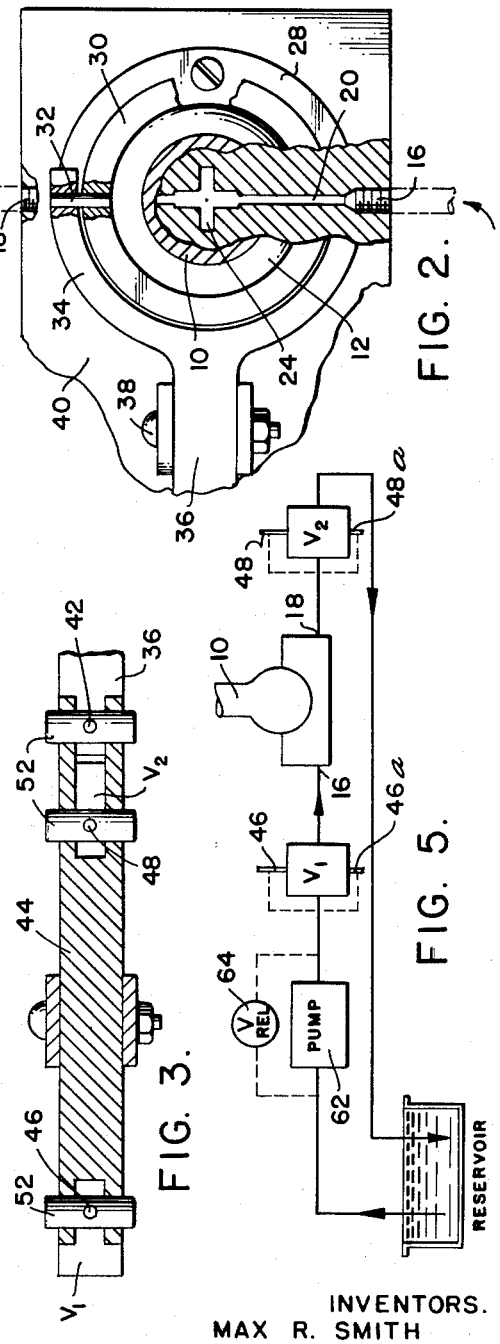
INVENTORS.
MAX R. SMITH
MELVIN D. HOWELL
BY
*V.C. Muller*
ATTORNEY.

United States Patent Office 3,139,750
Patented July 7, 1964

3,139,750
HYDRAULIC FORCE BALANCE APPARATUS
Max R. Smith, Ridgecrest, Calif., and Melvin D. Howell, 1106 1st Place, China Lake, Calif.; said Smith assignor to the United States of America as represented by the Secretary of the Navy
Filed Aug. 24, 1961, Ser. No. 133,746
2 Claims. (Cl. 73—141)
(Granted under Title 35, U.S. Code (1952), sec. 266)

The invention described herein may be manufactured and used by or for the Government of the United States of America for governmental purposes without the payment of any royalties thereon or therefor.

This invention relates to force balance apparatus and more particularly to apparatus in which rapidly changing forces are maintained balanced by hydraulic pressure.

In the testing of rocket motors it is conventional practice to attach the motor to a support and, during the burning of the motor propellant, measure the rocket thrust and also torque if the motor is of the spin type. These forces vary from zero to a maximum in a short period of time, which in some cases may be between a fraction of a second to several seconds, and during the burning the forces may vary considerably. If such forces are transformed in part into frictional forces it becomes difficult to accurately measure the desired forces and hence it becomes apparent that the support should be as free of friction as possible.

Hydraulically operated pistons, diaphragms and the like are also employed to exert variable forces on objects to be moved or controlled and to effect such movement, particularly when the force requirements change rapidly, presents problems in the operation of the hydraulic valves.

One of the objects of this invention is to provide a two valve control system for automatically balancing a variable force with hydraulic pressure.

Another object is to provide such a system for use in testing rocket motors.

Another object is provided such a system for controlling movement of a hydraulic actuator, such as a piston, diaphragm, bellows or other like device.

Other objects, advantages and salient features will become more apparent from the description to follow, the appended claims, and the accompanying drawing, in which:

FIG. 1 is a side elevation, partly in section, of apparatus for testing thrust of rocket motors;

FIG. 2 is a section taken on line 2—2, FIG. 1, portions being broken away;

FIG. 3 is a section taken on line 3—3, FIG. 1;

FIG. 4 is a modification of a portion of FIGS. 1 to 3; and

FIG. 5 is a diagrammatic hydraulic system which may be employed with any of FIGS. 1 to 4.

Referring now to the drawing, and particularly to FIG. 1, a support 10 or other member to be hydraulically actuated is provided with a ball 12 which seats in a spherical socket 14, the socket being provided with an inlet connection 16 and an outlet connection 18. The passageway 20 which connects the inlet and outlet extends tangentially adjacent the lower end of the ball. Adjacent the axis 22 the passageway communicates with a cruciform passage 24 which may distribute fluid under pressure to a desired area of the ball. Also to facilitate application of fluid pressure to a variable area of the ball the radius of the socket is slightly greater in radius near the bottom of the ball than at other portions (1.500" radius ball with 1.501" radius socket). This permits fluid to be fed to a certain area of the ball and as it lifts slightly this area increases. Leakage from the ball and socket is prevented by an O-ring 26 which is retained in position by an annular plate 28.

A ring 30 engages an upper portion of the ball and is connected by pivot pins 32 to a yoke 34 disposed on one end of a lever 36, the latter being connected by a pivot pin 38 to any suitable rigid frame structure 40 to which the ball socket is attached. The other end of the lever is connected by a link 42 to a second lever 44, pivotally connected to the frame, lever 44 having a pair of valve actuator rods 46, 48 pivotally connected to it. The lengths of rods 46, 48 and link 42 are all adjustable by threaded ends 50 which engage trunnions 52 pivotally connected to arm 44.

Each valve body 54 is provided with a ball type valve 56 which is urged towards its seat by a spring 58. Leakage past the actuator rods is prevented by any suitable packing such as an O-ring 60.

As best illustrated in FIG. 5, liquid pressure to the ball is supplied by a suitable constant pressure source, such as pump 62 having a spring loaded relief valve 64. Liquid delivered by the pump passes through valve $V_1$ to the ball socket and its discharge is controlled by valve $V_2$ which permits return of the liquid to a reservoir for recirculation by the pump.

Since valves $V_1$, $V_2$ are interconnected by lever 44 of a walking beam type lever it will be apparent that the valves open and close in opposition to each other, that is, as one valve moves toward open position the other moves toward closed position or vice versa.

The operation of the apparatus can be best understood by assuming that the ball is subjected to a predetermined axial load and such load then increases or decreases. When such load is applied valve $V_1$ has opened and valve $V_2$ has closed to provide liquid under pressure, which, acting on the effective area of the ball balances the axial load. It will now be assumed that the load increases which moves the ball toward a bottoming position on its spherical seat. Yoke 34 moves downwardly and the left end of arm 36 moves upwardly under urge of spring 66, moving valve $V_1$ toward open position and valve $V_2$ toward closed position. This admits more liquid to the ball under pressure and hydraulically balances the increased load, preventing bottoming of the ball. If the load now suddenly decreases the flow of liquid tends to raise the ball in its socket and yoke 34 moves arm 36 counterclockwise about pivot pin 38 moving valve $V_2$ toward open position and valve $V_1$ toward closed position. Liquid is thus rapidly bled from the ball by valve $V_2$ and at the same time the rate of delivery by valve $V_1$ is reduced. The combined action of the two valves has been found to produce significantly greater response to changes in load on the ball than could be attained by use of a single valve.

The rocket motor to be tested is secured to support 10 so that its thrust is along axis 22. Any suitable instrumentation may be connected to support 10 to measure or record the variations in thrust. If the motor is of the spin type its torque may also be similarly measured. Motors of the latter type may be connected directly to member 10 so that the latter rotates with the motor, the ball providing a thrust bearing. In such case the liquid delivered to the ball is preferably a lubricating oil. Alternatively, however, member 10 may be connected to the rocket motor through a separate anti-friction thrust bearing in such manner to permit the motor to spin with support 10 remaining stationary.

For simplicity of disclosure the valves have been illustrated as of the unbalanced type in FIG. 1. Preferably, however, as illustrated in FIG. 5, balanced valves are employed which utilize auxiliary rods 46a, 48a connected to actuator rods 46, 48 having cross-sectional areas equal to the valve seat areas which are subjected to the upstream pressures of the conduits communicating with each valve. With such construction, the forces on actuators 46, 48 to open the valves need be only sufficient to overcome the light spring pressures tending to close the valves.

FIG. 4 illustrates an alternative form of the invention in which a piston actuator $10a$, $12a$ analogous to support 10 and ball 12, is supplied with fluid and controlled by two valves $V_1$, $V_2$ through conduits $16a$, $18a$. Movement of the actuator is sensed by a lever $36a$ or other suitable sensing mechanism which controls opening and closing of the valves in the same manner previously described. The actuator may be connected to any member, the movement of which must be controlled in accordance with the forces to be applied by the actuator.

Obviously many modifications and variations of the present invention are possible in the light of the above teachings. It is therefore to be understood that within the scope of the appended claims the invention may be practiced otherwise than as specifically described.

What is claimed is:

1. Apparatus for testing the variable axial thrust of a rocket motor comprising; a support member to which the motor is affixed and having a ball at one end thereof through the center of which the thrust force is adapted to be applied, a spherical socket in which said ball is seated, and means for supplying liquid under pressure to said socket for forcing said ball in a direction opposite to the direction of the thrust force with a magnitude substantially in balance therewith, said means comprising a source of liquid under pressure, a first valve for admitting said liquid under pressure to the socket and a second valve for discharging liquid therefrom, and means responsive to movement of said member for controlling the operation of said valves, whereby the hydraulic force on said ball varies in accordance with the variable thrust, said last named means comprising a first lever operatively connected to said support and a second lever operatively connected to said first lever, and valves being operatively connected to said second lever.

2. Apparatus in accordance with claim 1 wherein said valves are of the balanced type.

References Cited in the file of this patent
UNITED STATES PATENTS

| | | |
|---|---|---|
| 2,172,095 | White | Sept. 5, 1939 |
| 2,707,392 | Metrailer | May 3, 1955 |